United States Patent [19]

Ensing

[11] 3,917,387

[45] Nov. 4, 1975

[54] EYEGLASS RETAINER

[76] Inventor: Ernest Ensing, 1441 Sandy Point Ave., SE., Grand Rapids, Mich. 49506

[22] Filed: Mar. 21, 1974

[21] Appl. No.: 453,300

[52] U.S. Cl............. 351/123; 24/73 HH; D57/1 A
[51] Int. Cl.² .......................................... G02C 5/14
[58] Field of Search.. 351/123, 158; 24/3 C, 73 LA, 24/73 HH, 81 A, 81 AA, 263 R, 263 P, 263 PJ; D57/1 A

[56] References Cited
UNITED STATES PATENTS

| | | | |
|---|---|---|---|
| 2,229,568 | 1/1941 | Hodgkins | 351/123 |
| 2,389,428 | 11/1945 | Glasser | 351/158 |
| 3,266,111 | 8/1966 | Shel | 351/158 X |

FOREIGN PATENTS OR APPLICATIONS

| | | | |
|---|---|---|---|
| 376,978 | 6/1923 | Germany | 351/123 |

Primary Examiner—Paul A. Sacher
Attorney, Agent, or Firm—Price, Heneveld, Huizenga & Cooper

[57] ABSTRACT

A pair of eyeglass retainers for securing eyeglasses to the wearer each include a temple hook at one end for securing the retainer to the temple of the eyeglass and an elongated downwardly and rearwardly curved hook adapted to fit under the earlobe thus securing the glasses to the head of the wearer. In one embodiment, the retainer was segmented into two portions separated at the shank of the elongated hook to provide an adjustable length shank to accommodate different sized ears. In such embodiment, means are provided for fixedly attaching the shank portions once the adjustment has been made.

10 Claims, 6 Drawing Figures

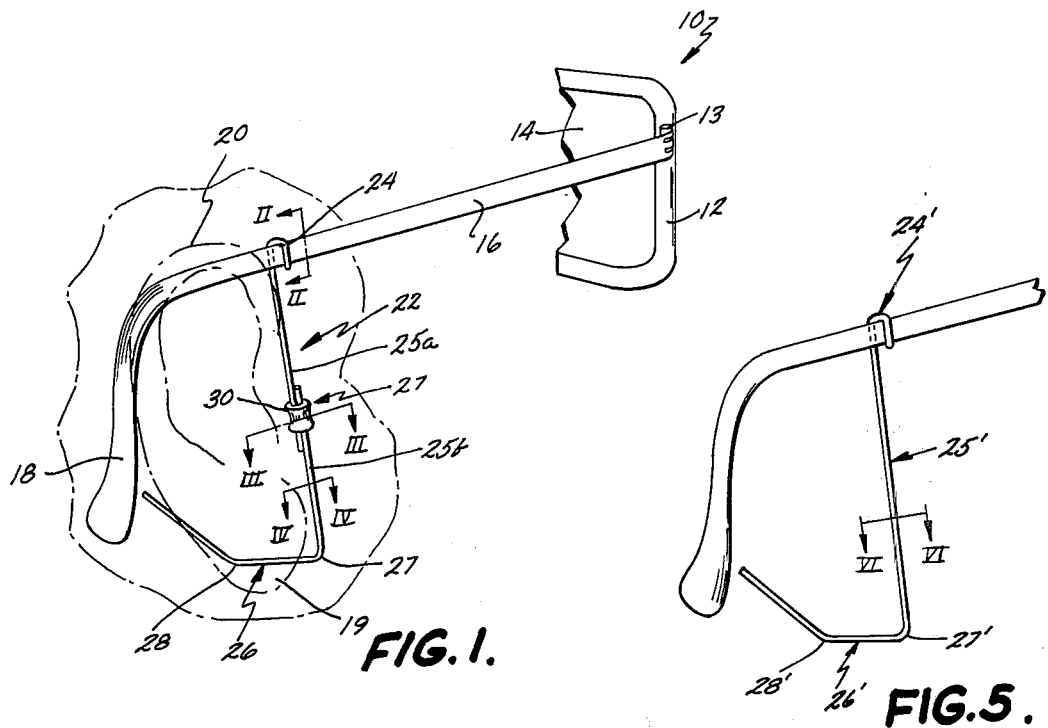
FIG. 1.
FIG. 5.
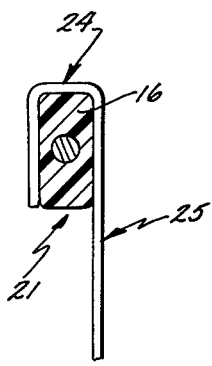
FIG. 2.
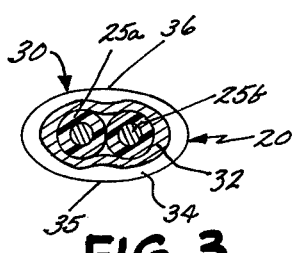
FIG. 3.
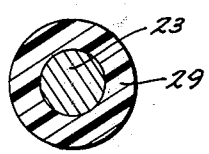
FIG. 4.
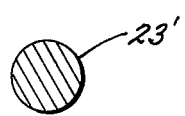
FIG. 6.

EYEGLASS RETAINER

BACKGROUND OF THE INVENTION

The present invention relates to eyeglass retainers.

During activities such as athletic endeavors, bending over and other movements, wearers of glasses frequently suffer from the unnerving tendency of their glasses to slip from the bridge of their noses or worse, fall off. To remedy this problem, several brute force retainers have been provided and include elastic bands attached to the ends of the temples and spanning the back of the user's head and a variety of loop devices such as illustrated in British Pat. No. 186,002 issued Jan. 12, 1922 and U.S. Pat. No. 836,796 issued Nov. 27, 1906 to W. S. Anderson.

Although these devices tend to adequately hold the glasses to the user's head, in the case of elastic bands the additional pressure applied to the bridge of the user's nose usually is uncomfortable and can be more bothersome than the problem in the first instance. Such retaining means also are not entirely effective in preventing the glasses from shifting vertically. Further, these retainers are unsightly at best and should the wearer catch his glasses on an object while moving, serious injury could result since the retainers will not permit the glasses to come off under such conditions where it would be preferable that they did. Also, prior art retainers of the type disclosed in the above identified patents are relatively complex and costly devices and are an integral permanent part of the glasses.

SUMMARY OF THE INVENTION

The eyeglass retainers of the present invention, however, are structurally uncomplicated and easily and adjustably attached and removed from the temples of the eyeglasses. They can be comfortably worn without increasing to any noticeable extent the discomfort of wearing glasses. By providing a hook made of a deformable material, the retainer means can be adjusted to the individual user and deflected for maximum comfort. In the event of accidental catching of glasses, the retainers will permit the glasses to be torn away without injury to the user while at the same time securely holding the glasses both horizontally and vertically in place during normal use including vigorous athletic activity.

Retaining means embodying the present invention include a wire-like rod of deformable material having a hook at one end for attaching the retainer to the temple of the eyeglass and a downwardly and rearwardly projecting hook for passing under the earlobe of the wearer. In one embodiment, the downwardly projecting shank was adjustable in length to accommodate individual wearers.

It is an object, therefore, of the present invention to provide an improved eyeglass retainer.

Another object of the present invention is to provide an eyeglass retainer of simplified construction which is comfortable for use.

Still a further object of the present invention is to provide a removable eyeglass retainer which can easily be attached and removed from a pair of eyeglasses.

These and other objects of the present invention will become apparent upon reading the following description thereof together with the accompanying drawings in which:

BRIEF DESCRIPTION OF THE DRAWINGS

FIG. 1 is a fragmentary perspective view of one embodiment of the present invention;

FIG. 2 is an enlarged, fragmentary cross-sectional view taken along the section lines II—II of FIG. 1;

FIG. 3 is an enlarged cross-sectional view taken along the section lines III—III of FIG. 1;

FIG. 4 is a greatly enlarged view taken along section lines IV—IV of FIG. 1;

FIG. 5 is a fragmentary perspective view of an alternative embodiment of the invention; and FIG. 6 is an enlarged cross-sectional view taken along section lines VI—VI of FIG. 5.

DETAILED DESCRIPTION OF THE PREFERRED EMBODIMENTS

It is noted here that the eyeglass retainer of the present invention comprises a pair of nearly identical retainers, the only difference being that one has a temple hook curved in a first direction for one of the temple members of an eyeglass while the remaining retainer has a temple hook extending in the opposite direction for the remaining temple piece of the eyeglass. Only the retainer for the right side of a pair of eyeglasses is described in detail herein.

Referring now to FIG. 1, there is shown in fragmentary form a pair of eyeglasses 10 including a frame 12 for supporting lenses 14. Hinged to each side of the frame 12 by means of hinge 13 is a temple piece or stem 16 which, in the embodiment shown, includes a downwardly and rearwardly projecting leg 18 which fits behind the ear 20 of the wearer. In the figure, the wearer's ear 20 is shown in phantom form to more clearly show the novel retainer 22.

Retainer 22 is a wire-like rod and includes a relatively small temple hook 24 extending outwardly from the wearer's head over temple 16 to partially circumscribe the wire reinforced plastic temple 16 as best seen in FIG. 2. The hook is open at 21 (FIG. 2) to permit easy attachment and removal. Hook 24 is sufficiently loose over temple 16 to permit sliding therealong for attachment and adjustment as described below.

Extending downwardly from hook 24 is the shank 25 of a relatively large ear hook 26. Shank 25 is divided into an upper segment 25a and a lower segment 25b overlapping at junction 27 and secured in an adjusted position by means of a collar 30. The relatively large rearwardly extending ear hook 26 is formed by bending shank 25 at 27 to extend rearwardly and again at 28 to extend slightly upwardly. This hook can be formed, however, by continuously bending in a semicircular or other configuration. Hook 26 lies in a plane substantially perpendicular to the plane of hook 24 as seen in FIGS. 1 and 2.

Retainer 22 is made from a wire-like rod which, in the embodiment shown in FIGS. 1–4, comprises a wire core 23 surrounded by a soft coating 29 (FIG. 4). In one embodiment successfully employed, wire 23 was 0.032 inch in diameter (i.e., 20-gauge ASWG) and made of hardened aluminum. In this embodiment, coating 29 was a sleeve of polyethylene tubing having an internal diameter of 0.070 inch and an outside diameter of 0.110 inch. Thus, the retainer was made by inserting the wire into the sheathing and subsequently bending it into the desired configuration as shown. Different diameter wire and sheathing can be employed and instead of employing a sleeve, wire 23 can be coated by dipping or spraying processes to form its protective covering. The covering can be of any desired color to match the temples of the glasses or the skin. In the embodiment described above, the sleeve was a catheter tube nonreactive to tissue and sold under the trademark INTRAMEDIC Model No. PE 260 by the Clay Adams Company, Parsippany, N. J. The covering can be made of a variety of plastic materials which are relatively soft and smooth. Such materials further include polyvinyl chloride, polypropylene and reinforced ABS.

In the adjustable embodiment shown in FIG. 1, collar 30 is provided and, as best seen in FIG. 3, comprises an inner metal cylindrical collar 32 coated with a sheath 34 on its exterior surfaces of a plastic material such as polyethylene. Collar 30 is, prior to adjustment, generally elliptical in shape but once legs 25a and 25b are adjusted for the comfort of an individual wearer, the collar is deformed by crimping at points 35 and 36, as shown in FIG. 3, to securely hold the legs relative to one another. This can be done by employing a pair of pliers or a crimping tool.

In the embodiment shown in FIG. 5, the retainers are not adjustable but are manufactured in, for example, three standard sizes - small, medium and large - with three lengths of shanks 25' such that the ear hook 26' will generally fit a class of wearers. In this embodiment, the retainer is a single wire piece 23' made identically as the embodiment shown in FIG. 1 and can be covered with a similar sheathing 29 as seen in FIG. 4 and described above. The sheathing, however, need not be employed since the wire 23 will by itself function basically the same. The wire only embodiment is shown in FIGS. 5 and 6. The addition of a sheath, however, increases the comfort and appearance of the retainers.

In use, the retainers are applied after the glasses are fitted on the wearer with the open hook 24 having its opening 21 directed upwardly and positioned to engage the temple piece 16 whereupon the retainer is pivoted such that the ear hook 26 is brought downwardly adjacent the face. In this position, the uppr end of shank 25 is between the temple 16 and the wearer. The retainers are so attached to avoid entanglement with the wearer's hair. After attachment of the hook, the retainer is slid rearwardly such that hook 24 is just forward of the ear. When initially used, the shank 25 is deformed to conform to the contour of the user's head immediately forward of the ear and, as noted above in the FIGS. 1–5 embodiment, collar 30 crimped for the selected shank length. Thus, the shank 25 can be adjusted and deformed for maximum comfort. Hook 26 is then extended under the lobe 19 of the ear and likewise can be deformed by bending up, down, inwardly or outwardly of the user's face to maximize the comfort to the wearer.

With the retainer positioned as seen in FIG. 1, the retainer secures the glasses to the head of the wearer without increasing the pressure on the bridge of the wearer's nose or against his face. Thus, the device can be worn in relative comfort and typically will be barely visible, if at all, particularly as in the embodiment shown in FIG. 5. It is noted that the retainers will work equally well with the type of glasses shown in FIG. 1 or those models without a significantly downwardly depending leg 18.

It will become apparent to those skilled in the art that various modifications of the invention can be made. For example, if it is desired to permanently attach the retainer to the temple pieces of the glasses, hook 24 can be made to surround the entire temple piece 16 thereby preventing its easy removal which can be achieved by the structure shown in the preferred embodiment. Also, it is to be understood that the wire 23 need not be coated although a polyethylene sheathing material, either in the form of a separately supplied sheath or as a directly deposited coating on the wire, can provide a flesh colored or eyeglass frame matching color as well as a softer surface for contact with the skin. It would be possible to market and sell the retainers as a section of wire accompanied by instructions on deforming aand configurating the wire in accordance with the principles of this invention.

Any suitable wire can be employed as long as it has the general characteristic of being stiffly deformable such that once it has intially been configurated to the user for maximum comfort, it will retain its shape for subsequent use. Simple coat hanger wire has been employed successfully in the manufacture of the retainers. As noted earlier, the retainer for the left temple is identical to that shown in the figures with the temple hook 24 being bent in the opposite direction to fit to the left temple piece of the glasses. The above enumerated, as well as other modifications to the preferred embodiments disclosed herein, can be made without departing from the spirit or scope of the invention as defined in the appended claims.

The embodiments of the invention in which an exclusive property or privilege is claimed are defined as follows.

1. Eyeglass retainer means including a pair of retainer members adapted to attach to the temples of the eyeglasses and extend under the ears of the wearer, each retainer member comprising:
 a wire-like stiffly deformable member having a first hook formed at one end for extending over the temple piece of a pair of glasses;
 a shank extending from said first hook; and
 a larger second hook formed at the opposite end of said member and lying in a plane substantially orthogonal to said first hook for fitting under and extending rearwardly of the ear of the wearer with said shank forward of the wearer's ear.

2. The apparatus as defined in claim 1 and further including a covering of relatively soft material over said member.

3. The apparatus as defined in claim 2 wherein said covering is a sleeve of relatively soft material placed over said wire-like member.

4. The apparatus as defined in claim 3 wherein said sleeve is polyethylene tubing.

5. The apparatus as defined in claim 1 wherein said first hook is open for easy attachment and removal from the temple of the glasses.

6. The apparatus as defined in claim 5 wherein said wire-like member is hardened aluminum wire.

7. The apparatus as defined in claim 1 wherein said member is segmented into two pieces at said shank and means are provided for coupling overlapping segments of said shank once the length of said shank has been selected for an individual's use and comfort.

8. The apparatus as defined in claim 7 wherein said coupling means comprises a deformable collar surrounding said overlapping ends of said shank and deformable to secure said segments in fixed relationship to one another.

9. A method of manufacturing an eyeglass retainer from a stiffly deformable wire-like member comprising the steps of:
forming a relatively small open hook at one end of the member for attachment to the temple of a pair of eyeglasses; and
forming a relatively large open hook at the opposite end of the member substantially orthogonal to said small hook for fitting under the ear of the wearer with the last-named hook extending rearwardly.

10. An eyeglass retainer adapted to attach to the temple of the eyeglasses and extend under the ear of the wearer, said retainer comprising:
a wire-like stiffly deformable member having a first open hook formed at one end for extending over the temple piece of a pair of glasses for easy attachment and removal of the member;
a shank extending from said first hook;
a larger second hook formed at the opposite end of said member and lying in a plane substantially orthogonal to the plane of said first hook for fitting under and extending rearwardly of the ear of the wearer with said shank forward of the wearer's ear; and
a covering of relatively soft material over said wire-like member.

* * * * *